United States Patent
Sugimoto et al.

(10) Patent No.: US 6,399,200 B1
(45) Date of Patent: Jun. 4, 2002

(54) THERMOPLASTIC ELASTOMER COMPOSITION, POWDER, PELLETS, AND MOLDINGS

(75) Inventors: Hiroyuki Sugimoto, Funabashi; Yoshihiro Nakatsuji, Chiba; Susumu Ejiri, Ichihara, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/581,131

(22) PCT Filed: Dec. 9, 1998

(86) PCT No.: PCT/JP98/05563
§ 371 (c)(1), (2), (4) Date: Jun. 9, 2000

(87) PCT Pub. No.: WO99/29775
PCT Pub. Date: Jun. 17, 1999

(30) Foreign Application Priority Data

Dec. 11, 1997 (JP) .............................................. 9-341277

(51) Int. Cl.[7] .................................................. B32B 5/16
(52) U.S. Cl. ........................ 428/402; 428/515; 428/520; 525/193; 525/194; 525/232
(58) Field of Search ................................. 525/232, 193, 525/194; 428/515, 520, 402

(56) References Cited

U.S. PATENT DOCUMENTS

| | | | |
|---|---|---|---|
| 5,191,024 A | 3/1993 | Shibata et al. | 525/314 |
| 5,948,850 A | 9/1999 | Enami et al. | 524/515 |
| 5,977,259 A | * 11/1999 | Sugimoto et al. | 525/232 |

FOREIGN PATENT DOCUMENTS

| | | |
|---|---|---|
| EP | 0811657 A2 | 12/1997 |
| JP | 62-172043 A | 7/1987 |
| JP | 05-287136 A | 11/1993 |
| JP | 07-082433 A | 3/1995 |
| JP | 08-199009 A | 8/1996 |
| JP | 09-052990 A | 2/1997 |

* cited by examiner

Primary Examiner—Leszek Kiliman
(74) Attorney, Agent, or Firm—Birch Stewart Kolasch & Birch LLP

(57) ABSTRACT

A thermoplastic elastomer composition containing (A), (B-1) and (B-2) described below and having a total content of (B-1) and (B-2) of 10 to 250 parts by weight per 100 parts by weight of the content of (A), a complex dynamic viscosity $\eta^*(1)$ at 250 ° C. of $1.5 \times 10^5$ poise or less and a Newtonian viscosity index n of 0.67 or less, and pellets obtained by using the thermoplastic elastomer composition, and a molded article thereof:

(A): a polyolefin-based resin;

(B-1): a conjugated diene-based thermoplastic elastomer or its hydrogenated product providing two tan δ peaks within a temperature range of −70 to 30° C. in a temperature dependence curve of tan δ determined by a solid viscoelasticity measurement of the composition obtained by being kneaded with (A); and (B-2): a conjugated diene-based thermoplastic elastomer or its hydrogenated product providing a new single tan δ peak at a temperature which is different from both the tan δ peak temperature of (A) and the tan δ peak temperature of (B-2) within a temperature range of −70 to 30° C. in a temperature dependence curve of tan δ determined by a solid viscoelasticity measurement of the composition obtained by being kneaded with (A).

18 Claims, No Drawings

THERMOPLASTIC ELASTOMER COMPOSITION, POWDER, PELLETS, AND MOLDINGS

This application is the national phase under 35 U.S.C. § 371 of PCT International Application No. PCT/JP98/05563 which has an International filing date of Dec. 9, 1998, which designated the United States of America.

TECHNICAL FIELD

The present invention relates to a thermoplastic elastomer composition, powder, pellets and a molded article. More specifically, the present invention relates to a thermoplastic elastomer composition having an excellent powder moldability and resistance at lower temperature and providing a molded article of a thermoplastic elastomer, being hardly whitened on bending, and powder, pellets and a molded article obtained by using said thermoplastic elastomer composition.

BACKGROUND ARTS

Hitherto, a sheet-like molded article having complicated uneven patterns such as leather grain, stitch and the like on its surface is used as a skin material of interior parts of an automobile, and the like. As such molded article, a molded article obtained by powder molding powder obtained by pulverizing an olefin-based thermoplastic elastomer is proposed as a replacing article of a conventional vinyl chloride-based resin molded article (for example, refer to Japanese Patent Publication (Kokai) Hei Nos.3-199579 and 3-199589). However, the molded article obtained by powder molding powder obtained by pulverizing such thermoplastic elastomer has problems that resistance at lower temperature and whitening resistance on bending are insufficient.

For example, when said molded article is used as a skin material of an instrument panel housing an air bag, it is required that it is not brittlely fractured at a lower temperature (−30° C. to −40° C.) and an extremely high expanding speed (1 to 100 m/sec.). When the resistance at lower temperature is insufficient, not only the air bag does not accurately expand on collision, but also there is a dangerousness that the broken pieces of the skin material are scattered on the face and the like of a driver to cause injury.

Further, because of being easily whitened on bending, there has been a problem that the bent portion of said molded article is apt to be easily whitened when said molded article is taken out from a mold at the production of said molded article or when said molded article is preliminarily molded before laminating said molded article on a substrate.

To solve such problems, a thermoplastic elastomer hardly whitening the bent portion of said molded article and a molded article thereof are proposed (refer to WO/97-00911). However, although the whitening resistance on bending is sufficient, the resistance at lower temperature was insufficient yet.

DISCLOSURE OF THE INVENTION

Under these circumstances, the object to be solved by the present invention is to provide a thermoplastic elastomer composition providing a molded article of a thermoplastic elastomer having an excellent powder moldability and resistance at lower temperature, and being hardly whitened on bending, pellets obtained by using said thermoplastic elastomer composition, and a molded article thereof.

Namely, the first invention among the present invention relates to a thermoplastic elastomer composition containing (A), (B-1) and (B-2) described below and having a total content of (B-1) and (B-2) of 10 to 250 parts by weight per 100 parts by weight of the content of (A), a complex dynamic viscosity $\eta^*(1)$ at 250° C. of $1.5 \times 10^5$ poise or less and a Newtonian viscosity index n of 0.67 or less;

(A): a polyolefin-based resin, (B-1): a conjugated diene-based thermoplastic elastomer or its hydrogenated product providing two tan $\delta$ peaks within a temperature range of −70 to 30° C. in a temperature dependence curve of tan $\delta$ determined by a solid viscoelasticity measurement of the composition obtained by being kneaded with (A), and (B-2): a conjugated diene-based thermoplastic elastomer or its hydrogenated product providing a new single tan $\delta$ peak at a temperature which is different from both the tan $\delta$ peak temperature of (A) and the tan $\delta$ peak temperature of (B-2) within a temperature range of −70 to 30° C. in a temperature dependence curve of tan $\delta$ determined by a solid viscoelasticity measurement of the composition obtained by being kneaded with (A).

Further, the second invention of the present invention relates to powder prepared from the thermoplastic elastomer composition of the fore-mentioned first invention.

Further, the third invention of the present invention relates to pellets prepared from the thermoplastic elastomer composition of the fore-mentioned first invention, the thermoplastic elastomer composition having a complex dynamic viscosity $\eta^*(1)$ at 250° C. of $5 \times 10^4$ poise or less and a Newtonian viscosity index n of 0.28 or less.

Further, the fourth invention of the present invention relates to a molded article obtained by powder molding the powder or the pellets comprising the thermoplastic elastomer composition of the fore-mentioned second or third invention.

BEST MODE FOR PRACTICING THE INVENTION

The component (A) of the present invention is a polyolefin-based resin, and at least one kind selected from a homopolymer or copolymer of at least one olefin having a high crystallinity. Said olefin includes olefins having 2 to 8 carbon atoms such as ethylene, propylene, 1-butene, 1-hexene, 1-octene and the like. The crystallinity of said (A) is preferably 50% or more. Examples of said (A) include a polyethylene, a polypropylene, a poly(1-butene) and a copolymer of propylene with an α-olefin other than propylene (e.g. 1-butene-1). When (A) is a propylene-ethylene copolymer or a propylene-1-butene copolymer, it is preferable since the thermoplastic elastomer composition of the present invention provides a molded article excellent in heat resistance and flexibility.

Further, a copolymer obtained by copolymerizing 2 or more of monomers selected from ethylene and α-olefins having 3 to 8 carbon atoms at two steps or more can be used. For example, a copolymer obtained by homopolymerizing propylene at the first step and copolymerizing propylene with ethylene or an α-olefin other than propylene at the second step can be used.

Further, when a molded article is produced by a powder molding method using the powder of the thermoplastic elastomer composition of the present invention, a melt flow rate (MFR) of (A) which was measured at 230° C. under a load of 2.16 kgf according to JIS K-7210 is usually within a range of 20 to 500 g/10 min., preferably 50 to 300 g/10 min., and preferably 100 to 300 g/10 min. in particular.

The component (B-1) of the present invention is a conjugated diene-based thermoplastic elastomer or its hydrogenated product providing two tan δ peaks within a temperature range of −70 to 30° C. in a temperature dependence curve of tan δ determined by a solid viscoelasticity measurement of the composition obtained by being kneaded with (A).

Further, the component (B-2) of the present invention is a conjugated diene-based thermoplastic elastomer or its hydrogenated product providing a new single tan δ peak at a temperature which is different from both the tan δ peak temperature of (A) and the tan δ peak temperature of (B-2) within a temperature range of −70 to 30° C. in a temperature dependence curve of tan δ determined by a solid viscoelasticity measurement of the composition obtained by being kneaded with (A).

It can be determined by being previously kneaded with (A) and carrying out a solid viscoelasticity measurement whether the conjugated diene-based thermoplastic elastomer or its hydrogenated product belongs to either (B-1) or (B-2).

The conjugated diene-based thermoplastic elastomer of (B-1) and (B-2) or its hydrogenated product includes a conjugated diene-based rubbery polymer, a hydrogenated conjugated diene-based rubbery polymer and the like.

The conjugated diene-based rubbery polymer is a conjugated diene polymer rubber or a conjugated diene-based copolymer rubber.

The conjugated diene polymer rubber is a polymer rubber prepared by polymerizing or copolymerizing at least one conjugated diene. Examples of the conjugated diene include conjugated dienes having 4 to 8 carbon atoms such as butadiene, isoprene, pentadiene, 2,3-dimethylbutadiene and the like.

Examples of the conjugated diene polymer include polybutadiene, polyisoprene, poly(1,3-pentadiene), a butadiene-isoprene copolymer and the like.

The conjugated diene-based copolymer rubber is a copolymer rubber of the same conjugated diene as that described above and a monomer other than said conjugated diene. Examples of the monomer other than the conjugated diene include a vinyl aromatic compound, a vinyl ester compound, an ethylenically unsaturated carboxylic acid ester compound, a vinyl nitrile compound, and the like. Among them, a vinyl aromatic compound is preferable.

Regarding the vinyl aromatic compound, the 1- or 2-position of the vinyl group may be substituted with an alkyl group such as a methyl group or the like. Examples of the vinyl aromatic compound include vinyl aromatic compounds having 8 to 12 carbon atoms such as styrene, p-methylstyrene, α-methylstyrene and the like.

A vinyl acetate and the like are exemplified as the vinyl ester compound.

As the ethylenically unsaturated carboxylic acid ester compound, methyl methacrylate, ethyl methacrylate, methyl acrylate, butyl acrylate and the like are exemplified. As the vinyl nitrile compound, acrylonitrile, methacrylonitrile and the like are exemplified.

Examples of such conjugated diene-based copolymer rubber include conjugated diene-vinyl aromatic compound copolymer rubbers such as a butadiene-styrene copolymer rubber, an isoprene-styrene copolymer rubber, a butadiene-isoprene-styrene copolymer rubber, a butadiene-p-methylstyrene copolymer rubber and the like; conjugated diene-vinyl ester compound copolymer rubbers such as a butadiene-vinyl acetate copolymer rubber and the like; conjugated diene-ethylenically unsaturated carboxylic acid ester copolymer rubbers such as a butadiene-methyl methacrylate copolymer rubber, a butadiene-methyl acrylate copolymer rubber and the like; and conjugated diene-vinyl nitrile compound copolymer rubbers such as a butadiene-acrylonitrile copolymer rubber and the like.

The hydrogenated conjugated diene-based rubber includes a hydrogenated conjugated diene polymer rubber or a hydrogenated conjugated diene copolymer rubber prepared by hydrogenating the fore-mentioned conjugated diene polymer rubber or conjugated diene-based copolymer rubber, and such hydrogenated conjugated diene-based rubber includes hydrogenated products of the above-mentioned conjugated diene-based rubbers.

These rubbery polymers can be easily produced by methods described in, for example, Japanese Patent Publication (Kokai) Hei No.2-36244, No.3-72512, No.7-118335, Sho No.56-38338, Sho No.61-60739 and the like.

Further, in the conjugated diene-based copolymer rubber or hydrogenated conjugated diene-based copolymer rubber, the content of the monomer unit other than the conjugated diene is 50% by weight or less and preferably 20% by weight or less because a molded article having an excellent flexibility is obtained.

When the content exceeds 50% by weight, the molded article obtained by molding the thermoplastic elastomer composition tends to be whitened on bending.

When the hydrogenated conjugated diene-based rubber is used as (B-1), the proportion of the number of hydrogenated conjugated diene units having a side chain with at least two or more of carbon atoms to the total number of hydrogenated conjugated diene units varies depending on the kind of the conjugated diene monomer unit used in polymerization, but is usually less than 50%, preferably 10 to 45%, and further preferably 20 to 40% as (B-1). Such proportion can be determined by $^1$H-NMR measurement.

In the thermoplastic elastomer composition of the present invention, it is observed by a transmission type electron microscope (TEM) that (B-1) has a property forming a domain at a unit of several μm or more in the amorphous phase of (A).

When the hydrogenated conjugated diene-based rubber is used as (B-2), the proportion of the number of hydrogenated conjugated diene units having a side chain with at least two or more of carbon atoms to the total number of hydrogenated conjugated diene units is usually 50% or more, preferably 60 to 95%, and further preferably 70 to 90% as (B-2), differing by the kind of the conjugated diene monomer unit used at polymerization. Such proportion can be determined by $^1$H-NMR measurement.

In the thermoplastic elastomer composition of the present invention, it is observed by a transmission type electron microscope (TEM) that (B-2) has a property of finely dispersing in the amorphous phase of (A) at a unit of several tens of nm.

(B-1) provides two tan δ peaks within a temperature range of −70 to 30° C. in a temperature dependence curve of tan δ determined by a solid viscoelasticity measurement of the composition obtained by being kneaded with (A). This behavior does not depend on the kneading strength of (B-1) and (A).

Further, (B-2) is a rubbery polymer characterized in providing a new single tan δ peak at a temperature which is different from both the tan δ peak temperature of (A) and the tan δ peak temperature of (B-2) within a temperature range of −70 to 30° C. in a temperature dependence curve of tan δ determined by a solid viscoelasticity measurement of the composition obtained by being kneaded with (A). Although it is good if the peak temperature of the new tan δ peak is different from both the tan δ peak temperature of (A) and the tan δ peak temperature of (B-2), it is usually lower temperature side than the peak temperature of the olefin-based resin.

Further, since (B-2) has a property of extremely dispersing well in the amorphous phase of (A), the above-mentioned behavior is observed when it is kneaded under a condition of a shearing rate of $1 \times 10^2$/sec., which is a comparatively weak kneading force, or more.

The solid viscoelasticity measurement can be carried out using a usual solid viscoelasticity measurement apparatus.

An effect of providing a molded article having an excellent resistance at lower temperature and being hardly whitened on bending, can be realized by using the above-described rubbery polymers having the specific properties in combination as (B-1) and (B-2).

MFR of each of (B-1) and (B-2) is preferably 2 g/10 min. or more, more preferably 5 g/10 min. or more, and preferably 10 g/10 min. or more in particular because a molded article excellent in appearance and strength is obtained when the molded article is produced by powder molding the thermoplastic elastomer composition of the present invention. There is particularly no upper limit, but the MFR is usually 300 g/10 min. or less.

The thermoplastic elastomer composition of the present invention contains the above-mentioned (A), (B-1) and (B-2), and has a total content of (B-1) and (B-2) of 10 to 250 parts by weight and preferably 40 to 200 parts by weight per 100 parts by weight of the content of (A). When the total amount of (B-1) and (B-2) is too small, a molded article obtained is inferior in flexibility, and on the other hand, when it is too large, the molded article obtained wears a sticky feeling.

The weight ratio of (B-1) to (B-2) is usually 5:95 to 95:5, and preferably 10:90 to 90:10. When (B-1) is too small, a molded article obtained happens to be inferior in resistance at lower temperature, and on the other hand, when (B-1) is too large, the molded article obtained is sometimes inferior in wrinkle-whitening resistance on bending.

The thermoplastic elastomer composition of the present invention may contain an ethylene-α-olefin-based copolymer rubber(C) in addition to (A), (B-1) and (B-2) which are essential components. When (C) is contained, a 10 thermoplastic elastomer composition excellent in cost-performance is provided without lowering resistance at lower temperature and whitening resistance on bending in the present invention.

The ethylene-α-olefin-based copolymer rubber (C) is a copolymer of ethylene and an α-olefin, a copolymer of ethylene, an α-olefin and a non-conjugated diene, and the like which is a polymer having little crystallinity or a polymer having a crystallinity of less than 50%. Herein, the α-olefin includes α-olefins having 3 to 10 carbon atoms such as propylene, 1-butene, 3-methyl-1-butene and the like, and the non-conjugated diene includes non-conjugated dienes having 5 to 15 carbon atoms such as dicyclopentadiene, 5-ethylidene-2-norbornene, 1,4-hexadiene, 1,5-cyclooctadiene, 2-methylene-5-norbornene and the like. Such ethylene-α-olefin-based copolymer rubber includes an ethylene-propylene copolymer rubber, an ethylene-1-butene copolymer rubber, an ethylene-propylene-5-ethylidene-2-norbornene copolymer rubber (hereinafter, referred to as "EPDM") and the like. Such ethylene-α-olefin-based copolymer rubber may be crosslinked.

The content of α-olefin unit in the ethylene-α-olefin-based copolymer rubber is preferably within the range of 5 to 40% by weight, and more preferably 10 to 35% by weight. The content of ethylene unit is usually 60 to 95% by weight, and preferably 65 to 90% by weight. The content of α-olefin unit and the content of ethylene unit can be determined by a $^{13}$C-NMR method, an infra-red rays absorption spectroscopy or the like. Further, when a molded article is produced by a powder molding method using the powder or pellets comprising the thermoplastic elastomer composition of the present invention, the Moony viscosity $\{ML_{1+4}(100°\,C.)\}$ of the ethylene-α-olefin-based copolymer rubber measured at 100° C. according to ASTM D-927-57T is preferably within the range of 10 to 350, and more preferably 15 to 300 from a viewpoint of strength of the molded article obtained.

The amount of (C) in case of using (C) is 250 parts by weight or less per 100 parts by weight of (A), and preferably 20 to 200 parts by weight. When (C) is too much, a molded article obtained sometimes wears a sticky feeling.

It is necessary that the thermoplastic elastomer composition of the present invention has a complex dynamic viscosity $\eta^*(1)$ at 250° C. of $1.5 \times 10^5$ poise or less from the viewpoint of molding processability. However, in the case of the thermoplastic elastomer applied to the powder used for powder molding method described below, the complex dynamic viscosity $\eta^*(1)$ at 250° C. is preferably $1 \times 10^2$ to $8 \times 10^4$ poise, and more preferably $3 \times 10^2$ to $5 \times 10^3$ poise from the viewpoint of molding processability.

Further, in case of the thermoplastic elastomer composition applied to the pellets which are used for powder molding method described below and produced by a solvent-treatment method, a strand-cut method or a die-face cut method, it is required that the complex dynamic viscosity $\eta^*(1)$ at 250° C. is $5.0 \times 10^4$ poise or less, preferably $1 \times 10^2$ to $3.0 \times 10^3$ poise, and more preferably $3 \times 10^2$ to $2 \times 10^3$ poise from the viewpoint of molding processability.

Wherein the complex dynamic viscosity $\eta^*(\omega)$ is a value calculated by using a storage modulus $G'(\omega)$ and a loss modulus $G''(\omega)$ at 250° C. and a vibration frequency of $\omega$ according to the calculation equation (1):

$$\eta^*(\omega) = \{[G'(\omega)]^2 + [G''(\omega)]^2\}^{1/2}/\omega \tag{1}$$

and the complex dynamic viscosity $\eta^*(1)$ is a complex dynamic viscosity at $\omega$ of 1 radian/second.

When $\eta^*(1)$ exceeds the fore-mentioned upper limit, the melt flowability of the thermoplastic elastomer composition becomes poor and it tends to become difficult to produce a molded article by a molding method in which the shear rate on molding is usually as low as 1 sec$^{-1}$ or less such as the powder molding or the like.

The thermoplastic elastomer composition of the present invention has a Newtonian viscosity index n of 0.67 or less, preferably 0.01 to 0.35, and more preferably 0.03 to 0.25. Further, in case of the thermoplastic elastomer composition applied to the pellets which are used for the powder molding method described below and produced by a solvent-treatment method, a strand-cut method or a die-face cut method, the Newtonian viscosity index n is 0.28 or less, preferably 0.01 to 0.25, and more preferably 0.03 to 0.20.

Herein, the Newtonian viscosity index n is a value calculated by using the fore-mentioned complex dynamic viscosity $\eta^*(1)$ and a complex dynamic viscosity $\eta^*(100)$ measured at 250° C. and a vibration frequency $\omega$ of 100 radian/second according to the calculation equation (2):

$$n=\{\log \eta^*(1)-\log \eta^*(100)\}/2 \qquad (2)$$

When the Newtonian viscosity index n exceeds the fore-mentioned upper limit, the mechanical strength of the molded article obtained lowers.

Examples of the method of obtaining the thermoplastic elastomer composition of the present invention include the following method. Namely, (A), (B-1) and (B-2), and if necessary, (C) are melt-kneaded. Further, after all or a part of respective components of (A), (B-1) and (B-2), and if necessary, (C) selected from these components are kneaded or dynamically crosslinked, it can be also produced by melt-kneading the components not selected.

For example, the thermoplastic elastomer composition of the present invention in which (A) and/or (C) are intramolecularly and/or inter-molecularly crosslinked can be usually produced by dynamically crosslinking (A) and (C) and then further adding and kneading (B-1) and (B-2). Herein, a single screw extruder, a twin screw extruder or the like can be used for kneading these rubbery polymers. Further, the compounding of various kind of additives described below can be carried out, for example, by using (A), (B-1), (B-2) or (C) in which these additives are previously compounded, or by adding them during kneading or dynamically crosslinking the above-mentioned components.

For example, the dynamic crosslinking of said kneaded mixture can be carried out by kneading said kneaded mixture and a crosslinking agent under heating. As the crosslinking agent, organic peroxides such as 2,5-dimethyl-2,5-di(t-butylperoxy) hexane, dicumyl peroxide and the like can be used. The crosslinking agent is usually used within the range of 1 part by weight or less, preferably 0.1 to 0.8 part by weight, and more preferably 0.2 to 0.6 part by weight per 100 parts by weight of the total components which are subjected to crosslinking among (A), (B-1), (B-2), and if necessary, (C). When an organic peroxide is used as the crosslinking agent, the thermoplastic elastomer composition providing a molded article having an excellent heat resistance, can be obtained when the dynamic crosslinking is carried out in the presence of a crosslinking aid such as a bismaleimide compound or the like. In this case, the amount of the organic peroxide used is usually 0.8 part by weight or less, preferably 0.2 to 0.8 part by weight, and more preferably 0.4 to 0.6 part by weight per 100 parts by weight of the total components which are subjected to crosslinking among (A), (B-1), (B-2), and if necessary, (C).

The amount of the crosslinking aid used is usually 1.5 parts by weight or less, preferably 0.2 to 1 part by weight, and more preferably 0.4 to 0.8 part by weight per 100 parts by weight of the total of (A), (B-1), (B-2), and if necessary, (C). The crosslinking aid is preferably compounded before the addition of the crosslinking agent, and usually added when the fore-mentioned components which are subject to crosslinking, is preliminarily kneaded.

The crosslinking of (A), (B-1), (B-2), and (C) can be carried out by kneading the components provided for crosslinking among these, the crosslinking agent, and if necessary, further the crosslinking aid under heating, for example, at a temperature range of 150 to 250° C. using a single screw extruder, a twin screw extruder or the like while heating.

By the dynamic crosslinking under the above-mentioned conditions, usually, (B-1) and (B-2) are preferentially crosslinked intramolecularly and/or intermolecularly. When (C) is used, (C) is also intramolecularly and/or intermolecularly crosslinked. Further, (A) may be intramolecularly and/or intermolecularly crosslinked, (A) and (B-1) maybe intermolecularly crosslinked, (A) and (B-2) may be intermolecularly crosslinked, (A) and (C) may be intermolecularly crosslinked, (B-1) and (C) may be intermolecularly crosslinked, and (B-2) and (C) may be intermolecularly crosslinked. The thermoplastic elastomer composition of the present invention can contain any type of crosslinked products.

The thermoplastic elastomer composition of the present invention may contain additives, for example, such as a mineral oil-based softener; a thermal stabilizer such as a phenol-based, a sulfite-based, a phenylalkane-based, a phosphite-based, an amine-based or an amide-based thermal stabilizer; an anti-aging agent; an weathering stabilizer; an antistatic agent; a lubricant such as a metal soap, a wax or the like; an internal mold release agent such as a methylpolysiloxane compound, a silicone compound or the like; a pigment and the like.

Further, rubbery polymers such as a copolymer rubber of propylene and α-olefin having 4 carbon atoms or more, a natural rubber, a butyl rubber, a chloroprene rubber, an epichlorohydrin rubber, an acrylic rubber and the like; and other polymer components such as an ethylene-acrylic acid copolymer, an ethylene-vinyl acetate copolymer and a saponified product thereof, an ethylene-methyl methacrylate copolymer, an ethylene-glycidyl methacrylate-vinyl acetate copolymer, an ethylene-glycidyl methacrylate-vinyl acetate copolymer or the like may be contained so far as the objective of the present invention is not damaged.

These additives and other polymer components may be previously contained in (A), (B-1), (B-2) and (C) and used, or may be compounded during the above-mentioned kneading or dynamic crosslinking, or by kneading thereafter, or the like.

The mineral oil-based softener is preferably used because the thermoplastic elastomer composition containing the mineral oil softener is superior in melt flowability and provides a molded article having an excellent flexibility. When an oil-extended olefin-based copolymer rubber previously containing the mineral oil-based softener in (C) is used, the above-mentioned kneading and dynamic crosslinking can be easily carried out.

Further, in order to produce the thermoplastic elastomer composition of the present invention which satisfies the values of physical properties represented by the fore-mentioned complex dynamic viscosity and the Newtonian viscosity index, the degree of the above-mentioned kneading and dynamic crosslinking, the kind and the amount used of the respective components constituting said thermoplastic elastomer composition, the kinds and amounts used of the crosslinking agent and the crosslinking aid in the dynamic crosslinking, and the kinds and amounts used of the additives are suitably selected. Among them, effects of the shear rate in the kneading and dynamic crosslinking on the above-mentioned values of physical properties are large, and the kneading and dynamic crosslinking are preferably carried out at a shear rate of $1 \times 10^3$ $sec^{-1}$ or more.

The thermoplastic elastomer composition of the present invention can be processed to a molded article having various sizes and shapes according to various molding methods other than powder molding. The molded article obtained from the thermoplastic elastomer composition of the present invention has characteristics of being excellent in resistance at lower temperature and hardly whitened on bending. For example, the thermoplastic elastomer composition of the present invention can be molded to various molded articles from its molten mass, for example, the above-mentioned molten mixture according to, for example, press molding, injection molding, extrusion molding or the like. The size and shape of the molded article are not particularly limited.

For example, in order to produce a molded article by powder molding, the powder or the pellets of the thermoplastic elastomer composition of the present invention may be subjected to powder molding. It can be processed to a molded article such as a sheet, a film or the like.

As the method of pulverizing the thermoplastic elastomer composition, a freeze-pulverization method is mentioned. The freeze-pulverization method is a method by which said thermoplastic elastomer composition is cooled to preferably −70° C. or less, and more preferably −90° C. or less below the glass transition temperature and pulverized while keeping a cooled state. When the thermoplastic elastomer composition is pulverized at a higher temperature than the glass transition temperature, the obtained powder becomes irregular in size and tends to be difficult to carry out the powder molding. Further, in order to grind the thermoplastic elastomer composition while keeping its cooled state, it is preferable to pulverize by a method with good pulverization efficiency and little heat generation. For example, a mechanical pulverization method using an impact grinder such as a ball mill or the like is used. The powder of the thermoplastic elastomer composition obtained by this method has a size enough to pass a Tyler standard sieve of 24 mesh (opening of 700 $\mu$m×700 $\mu$m), and preferably 28 mesh (opening of 590 $\mu$m×590 $\mu$m).

Further, the powder of the thermoplastic elastomer composition obtained by the mechanical pulverization method has a tendency of coagulation, and when the powder slush molding is carried out after long term conservation, underfills and pinholes happen to occur on the molded article. Accordingly, the cohesiveness can be improved by adding the fine powder of an inorganic material such as a powdery pigment, alumina, silica or the like having a particle diameter of about 30 $\mu$m or less (refer to Japanese Patent Publication (Kokai) Hei No.4-55105).

Further, when the pellets produced by the solvent-treatment method, the strand cut method or the die-face cut method are applied to the powder molding, there can be obtained a molded article having a complicated shape such as a convex portion and being free from a drawback such as underfills, pinholes or the like, by using the powder having a sphere-reduced average diameter of 1.2 mm or less and a bulk specific gravity of 0.38 or more.

Herein, the sphere-reduced average diameter of the pellets is defined as the diameter of a sphere having the same volume as an average volume of said pellets. The average volume (V) of the pellets is defined by the equation described below which relates to the total weight (W) of the randomly selected hundred particles of the pellets of the thermoplastic elastomer composition, the density (D) of the thermoplastic elastomer composition, and the average volume (V):

$$V=W/D$$

The sphere-reduced average diameter is usually 1.2 mm or less and preferably 0. 15 mm to 1.0 mm. When the sphere-reduced average diameter exceeds 1.2 mm, the heat fusion of the pellets during the powder molding becomes insufficient, and pinholes, underfills and the like occur on the molded article obtained.

Further, the bulk specific gravity is a value calculated from the weight of 100 ml of the pellets of the thermoplastic elastomer composition fed to a container for measuring bulk specific gravity from a funnel for measuring bulk specific gravity according to JIS K-6721, and is usually 0.38 to 0.65, and preferably 0.42 to 0.65. When the bulk specific gravity is less than 0.38, adhesion of the pellets onto the mold surface in the powder molding becomes insufficient and pinholes, underfills and the like tends to occur on the molded article, which results in poor appearance.

The above-mentioned pellets can be produced by various methods described below.

Freeze Pulverization-solvent Treatment Method

The thermoplastic elastomer composition is cooled below the glass transition temperature (usually −70° C. or less, and preferably −90° C. or less) and pulverized.

Then, the powder produced by the above-mentioned freeze-pulverization method is stirred in the presence of a dispersing agent and an emulsifier at a melting temperature of the thermoplastic elastomer composition or more and preferably at a higher temperature by 30 to 50° C. than said melting temperature in a solvent whose compatibility with the thermoplastic elastomer composition is poor, and then cooled (for example, refer to Japanese Patent Publication (Kokai) Sho No.62-280226).

Strand Cut Method

The molten thermoplastic elastomer composition is extruded from a die to form a strand, and then the strand is cooled and cut (for example, refer to Japanese Patent Publication (Kokai) Sho No.50-149747).

Die Face Cut Method

The molten thermoplastic elastomer composition is cut while being extruded from a die into water.

In the above-mentioned solvent treatment method, a solvent such as, for example, ethylene glycol, polyethylene glycol, polypropylene glycol or the like is usually used within the range of 300 to 1000 parts by weight and preferably 400 to 800 parts by weight, per 100 parts by weight of the thermoplastic elastomer composition.

The dispersing agent such as, for example, an ethylene-acrylic acid copolymer, silicic acid anhydride, titanium oxide or the like is usually used within the range of 5 to 20 parts by weight and preferably 10 to 15 parts by weight, per 100 parts by weight of the thermoplastic elastomer composition. The emulsifier such as, for example, polyoxyethylene sorbitan monolaurate, polyethylene glycol monolaurate, sorbitan tristearate or the like is usually used within the range of 3 to 15 parts by weight and preferably 5 to 10 parts by weight, per 100 parts by weight of the thermoplastic elastomer composition.

In the fore-mentioned strand cut method, a diameter of a discharge opening of the die is usually within the range of 0.1 to 3 mm and preferably 0.2 to 2 mm. A discharge rate of the thermoplastic elastomer composition per one discharge opening of the die is usually within the range of 0.1 to 5 kg/hr and preferably 0.5 to 3 kg/hr. A haul-off rate of a strand is usually within the range of 1 to 100 m/min. and preferably 5 to 50 m/min. Further, the strand cooled is usually cut by 1.4 mm or less, and preferably 0.3 to 1. 2 mm.

In the fore-mentioned die face cut method, a diameter of a discharge opening is usually within the range of 0.1 to 3 mm and preferably 0.2 to 2 mm. A discharge rate of the thermoplastic elastomer composition per one discharge opening of the die is usually within the range of 0.1 to 5 kg/hr and preferably 0.5 to 3 kg/hr. The temperature of water is usually within the range of 30 to 70° C. and preferably 40 to 60° C.

The powder or the pellets of the above-mentioned thermoplastic elastomer composition can be applied to various powder molding methods such as a powder slush molding method, a fluidization dip method, an electrostatic coating method, a powder spray method, a powder rotational molding method and the like; and a press molding method, an extrusion molding method, an injection molding method and the like. For example, the powder slush molding method is carried out as follows:

Firstly, the powder or the pellets of the thermoplastic elastomer composition are fed on the molding face of a mold which is heated to a temperature higher than the melt temperature of said composition, usually 160 to 300° C. and preferably 210 to 270° C. The fore-mentioned powder or the pellets are heated for a predetermined time on the molding face, and the powder or the pellets whose surface is at least melted are adhered each other. After said predetermined time elapsed, the powder or the pellets which were not adhered are recovered. If necessary, the mold on which the molten thermoplastic elastomer composition is mounted is further heated. Then, the mold is cooled and a sheet formed on the mold is removed from the mold. In such methods, the mold is heated, for example, by a gas heating furnace method, a heat transfer medium-circulation method, a dipping into a heat transfer medium oil or a heated fluidized sand, a microwave induction heating system or the like. A heating time for thermally fusing the powder or the pellets of the thermoplastic elastomer composition is suitably selected in accordance with the size and thickness of the molded article aimed.

The molded article of the present invention obtained from the powder or the pellets of the thermoplastic elastomer composition of the present invention has characteristics having no problems such as underfills, pinholes and the like, being excellent in formability and resistance at lower temperature, and being hardly whitened on bending.

Further, a foamed molded article having an excellent flexibility can be produced by various molding methods such as a powder molding method, a press molding method, an extrusion molding method, an injection molding method and the like, using the powder or the pellets of the thermoplastic elastomer composition of the present invention containing the foaming agent. For example, a foamed molded article can be produced by powder molding the powder or the pellets of the thermoplastic elastomer composition of the present invention containing the foaming agent and further foaming it.

The foaming agent may be previously contained in the inside of the powder or the pellets, and may be coated on the surface of the powder or the pellets by a rotary mixer such as a Henschel mixer or the like.

As the foaming agent, a thermal decomposition type foaming agent is usually used. Examples of the thermal decomposition type foaming agent include azo compounds such as azodicarbonamide, 2,2'-azobisisobutyronitrile, diazodiaminobenzene and the like; sulfonyl hydrazide compounds such as benzenesulfonyl hydrazide, benzene-1,3-sulfonyl hydrazide, p-toluenesulfonyl hydrazide and the like; nitroso compounds such as N,N'-dinitrosopentamethylenetetramine, N,N'-dinitroso-N,N'-dimethylterephthalamide and the like; azide compounds such as teraphthalazide and the like; and carbonates such as sodium hydrogencarbonate, ammonium hydrogencarbonate, ammonium carbonate, and the like. Among them, azodicarbonamide is preferably used. The compounding of the foaming agent is usually carried out at a lower temperature than the decomposition temperature of the foaming agent. Further, the thermoplastic elastomer composition of the present invention may contain a foaming aid and a cell adjuster together with the foaming agent.

The molded article obtained by molding the thermoplastic elastomer composition of the present invention is useful as a skin material, and a two-layer molded article obtained by laminating a foamed layer on one surface of the molded article may also be used as the skin material. Such two-layer molded article can be integrally produced by the powder molding method (refer to Japanese Patent Publication (Kokai) Hei No.5-473 and the like) and may also be produced by bonding a separately produced foamed material to the molded article obtained as described above using an adhesive.

To produce the two-layer molded article by the powder molding method, for example, a mold whose molding surface may be provided with a complicated pattern is heated to a temperature higher than the melt temperature of the thermoplastic elastomer composition, and then the powder or the pellets of the above-mentioned thermoplastic elastomer composition is fed on the molding surface of said mold, and the powder or the pellets are melted and adhered each other to obtain a sheet-like melt on the molding surface. Successively, the unadhered extra powder or pellets are removed, then the powder or pellets of the thermoplastic polymer composition containing the foaming agent are fed on this sheet-like melt and the powder or the pellets are thermally fused each other to obtain a sheet-like melt on the molding surface. Then, the unadhered extra powder or pellets are removed, and successively further heated and foamed to form a foamed layer.

Further, it is also possible-to form a composite molded article composed of a non-foam layer, a foamed layer and anon-foam layer by the powder molding method. In this case, the non-foam layers may be the same or different.

The foaming agent include the same thermal decomposition type foaming agents as those described above. Examples of the polymer component in the thermoplastic polymer composition containing such foaming agent include a vinyl chloride-based resin, a polyolefin, an olefin-based thermoplastic elastomer and the like. It is also possible to use a expabdable polyethylene-based composition used as a thermoplastic polymer composition containing the foaming agent in Japanese Patent Publication (Kokai) Hei No.7-228720. As the foamed layer, a polyurethane foamed article can also be used. In this case, since adhesion between the thermoplastic elastomer composition of the present invention and polyurethane tends to be inferior, the adhesion can be usually improved by pre-treating the surface of the molded article to be adhered, with a primer such as a chlorinated polyethylene or the like.

Further, the polyurethane foamed article can be molded by fixing the above-mentioned molded article and a core material described later to the predetermined position with providing a fixed distance, pouring a previously mixed liquid of a polyol and a polyisocyanate, followed by foaming under pressure.

Such molded article or two-layer molded article is suitable as a skin material to be laminated on a thermoplastic resin core material. For example, the above-mentioned molded article can be used for a multi-layer molded article obtained by laminating the thermoplastic resin core material on one surface thereof. Further, the two-layer molded article can be used for a multi-layer molded article obtained by laminating the thermoplastic resin core material on the foamed layer side thereof.

As the thermoplastic resin in the thermoplastic resin core material, for example, thermoplastic resins such as a polyolefin such as a polypropylene, a polyethylene or the like; ABS resin(acrylonitrile-butadiene-styrene copolymer) and the like can be used. Among them, polyolefins such as a polypropylene and the like are preferably used.

Such multi-layer molded article can be easily produced, for example, by a method of feeding a thermoplastic resin melt on one surface of the molded article and by pressing, or a method of feeding a thermoplastic resin melt on the foamed layer side of the two-layer molded article and by pressing.

The thermoplastic resin melt means a thermoplastic resin in the molten state by heating to a temperature higher than its melt temperature. Such thermoplastic resin melt may be fed before or simultaneously on pressing. Further, the pressing may be carried out by using a mold or the like, or carried out by a feeding pressure of the thermoplastic resin melt. Examples of the molding method include an injection molding method, a low-pressure injection molding method, a low-pressure compression molding method and the like.

Specifically, for example, in case of using the above-mentioned molded article as a skin material, the molded article is fed between a pair of opened molds, and then both molds may be clamped after or while feeding a thermoplastic resin melt between one surface of the molded article and one mold which is opposite to the surface. In case of using a two-layer molded article as the skin material, the two-layer molded article is fed between a pair of opened molds, and then both molds may be clamped after or while feeding a thermoplastic resin melt between the foamed layer of the molded article and one mold which is opposite to the foamed layer. Herein, the opening/closing direction of both molds is not specifically limited, and may be a vertical direction or a horizontal direction.

When using the molded article or the two-layer molded article produced by using the fore-mentioned mold for powder molding as a skin material, said mold for powder molding can be used as one mold in the production of the above-mentioned multi-layer molded article while holding the molded article or the two-layer molded article on the molded surface. According to this method, since the molded article or the two-layer molded article to which a pattern of the mold is transferred is fed between the molds without being separated from the molds, a desired multi-layer molded article can be obtained with little damage of the pattern provided on the surface.

The thermoplastic resin melt may be fed after the completion of clamping both molds, but both molds are preferably clamped while or after feeding when both molds are not closed, because there can be obtained a multi-layer molded article wherein the molded article or the two-layer molded article scarcely shifts and a transfer degree of the pattern is improved. The method of feeding the thermoplastic resin melt is not specifically limited, and for example, the thermoplastic resin melt can be fed through a resin passage provided in one mold which is opposite to the molded article or the two-layer molded article. Further, a feeding nose of the molten resin is inserted between both molds and the molten resin is fed, and then the feeding nose may be removed out of the system to close both molds.

As a pair of molds, there can be used a pair of male/female molds wherein the outer peripheral surface of the one mold and inner peripheral surface of the other mold are capable of sliding. In this case, by setting a clearance in sliding surface between molds to almost the same value as that of a thickness of the molded article or the two-layer molded article, a multi-layer molded article having a marginal portion of the skin material around the article edges can be obtained. When the marginal portion of the skin material is folded back onto the back side of the multi-layer molded article, the multi-layer molded article whose edges portion are covered with the skin material can be obtained.

The present invention is illustrated in detail according to Examples below, but the present invention is not limited these Examples.

The evaluations of the thermoplastic elastomer composition and the molded article were conducted according to methods below:

(1) Complex Dynamic Viscosity $\eta^*(1)$ and Newtonian Viscosity Index N

A storage modulus $G'(\omega)$ and a loss modulus $G''(\omega)$ were measured at a vibration frequency $\omega$ of 1 radian/sec. or 100 radian/sec. by using a Dynamic Analyzer (RDS-7700 manufactured by Rheometrix Inc.), and then $\eta^*(1)$ and $\eta^*(100)$ were calculated by the fore-mentioned calculation equation (1). Further, the measurement was carried out at an applied strain of 5% and a sample temperature of 250° C. in a parallel plate mode.

Further, the Newtonian viscosity index n was determined by the fore-mentioned calculation equation (2) using $\eta^*(1)$ and $\eta^*(100)$.

(2) Proportion of the Number of Hydrogenated Conjugated Diene Units Having a Side Chain with at Least Two Carbon Atoms to the Total Number of Hydrogenated Conjugated Diene Units in (B-1) and (B-2)

It was determined by using a o-xylene-d10 as a solvent and measuring $^1$H-NMR (400 MHz) at a concentration of 1.6 mg/ml.

(3) Whitening on Bending

The molded sheet with a thickness of 1 mm obtained by the powder slush molding method described later was cut into pieces of 1 cm×5 cm and they were bent by applying a bending load of 500 g or 1 kg. Then, the load was removed after one minute, and the evaluation was carried out on the basis of the width of the portion whitened on bending according to the criteria described below:

X: The width of the whitened portion is 1 mm or more.

Δ: The width of the whitened portion is less than 1 mm.

○: No whitened portion is recognized.

(4) Solid Viscoelasticity

A solid viscoelasticity measuring apparatus; REOVIBRON (DDV-II-EA model) of Orientec Industry Co., Ltd. was used and tension mode was applied. A sample of 2 cm×5 cm (provided that 3.5 cm between chucks)×0.1 mm in thickness was prepared by a press molding and the measurement was carried out by vibrating the sample within the range of −150 to 130° C. at a heating rate of 2° C./min., a vibration frequency of 110 Hz and a vibration amplitude of 16 μm to determine a peak temperature and an intensity of a tan δ peak.

(5) Brittle Temperature (Resistance at Lower Temperature)

The molded sheet with a thickness of 1 mm obtained by the powder slush molding method described later was used, and a temperature at which 50% of the test pieces were fractured was determined according to JISK-7216.

Material used

In Examples below, as (B-1), a hydrogenated product of butadiene-styrene copolymer [styrene unit content of 20% by weight, hydrogenation ratio of 99%, $\eta^*(1)$ of $1.7 \times 10^3$ poise, n of 0.02, MFR of 30 g/10 min., the proportion of the number of hydrogenated conjugated diene units having a side chain with at least two carbon atoms to the total number of hydrogenated conjugated diene units of 42%, the peak temperature of tan δ peak of −37° C., intensity of 0.88] was used. Further, as (A), a propylene-ethylene random copolymer resin [the peak temperature of tan δ peak of −7° C., intensity of 0.12, ethylene unit content of 5% by weight, MFR of 228 g/10 min.] was used.

These were kneaded at the proportion of Table 1 under conditions of 180° C. and 50 rpm for 10 minutes using a LABOPLASTOMILL (Model 30C150: manufactured by Toyo Seiki Co., Ltd.) to obtain the compositions (charge amount into the mill was 84 g in total) and to determine the peak temperature and the intensity of tan δ peak of the compositions by solid viscoelasticity measurement. The compositions obtained provided two tan δ peaks at a temperature range of −70° C. to 30° C. The peak temperature and the intensity of tan δ peak of these compositions are shown in Table 1.

As (B-2), a hydrogenated product of butadiene-styrene copolymer [styrene unit content of 10% by weight, hydrogenation ratio of 99%, η*(1) of $8.3 \times 10^3$ poise, n of 0.16, MFR of 10 g/10 min., the proportion of the number of hydrogenated conjugated diene units having a side chain with at least two carbon atoms to the total number of hydrogenated conjugated diene units of 71%, the peak temperature of tan δ peak of −17° C., intensity of 1.5] was used. Further, as (A), a propylene-ethylene random copolymer resin [the peak temperature of tan δ peak of −7° C., intensity of 0.12, ethylene unit content of 5% by weight, MFR of 228 g/10 min.] previously described was used.

Theses were kneaded at the proportion of Table 2 under conditions of 180° C. and 50 rpm for 10 minutes using a LABOPLASTOMILL (Model 30C150: manufactured by Toyo Seiki Co., Ltd.) to obtain the compositions (charge amount into the mill was 84 g in total) and to determine the peak temperature and the intensity of tan δ peak of the compositions which was obtained by solid viscoelasticity measurement. The compositions obtained provided new single tan δ peak at a temperature which is different from both the tan δ peak temperature of (A) and the tan δ peak temperature of (B-2) at a temperature range of −70° C. to 30° C. The peak temperature and the intensity of tan δ peak of these compositions are shown in Table 1.

EXAMPLE 1

100 Parts by weight of a propylene-ethylene copolymer resin [ethylene unit content of 5% by weight, MFR of 228 g/10 min., the peak temperature of tan δ peak of −7° C., intensity of 0.12], 87.5 parts by weight of a hydrogenated product of butadiene-styrene copolymer [styrene unit content of 20% by weight, hydrogenation ratio of 99%, η*(1) of $1.7 \times 10^3$ poise, n of 0.02, MFR of 30 g/10 min., the proportion of the number of hydrogenated conjugated diene units having a side chain with at least two carbon atoms to the total number of hydrogenated conjugated diene units of 42%, the peak temperature of tan δ peak of −37° C., intensity of 0.88] as (B-1), 12.5 parts by weight of a hydrogenated product of butadiene-styrene copolymer [styrene unit content of 10% by weight, hydrogenation ratio of 99%, η*(1) of $8.3 \times 10^3$ poise, n of 0.16, MFR of 10 g/10 min., the proportion of the number of hydrogenated conjugated diene units having a side chain with at least two carbon atoms to the total number of hydrogenated conjugated diene units of 71%, the peak temperature of tan δ peak of −17° C., intensity of 1.5] as (B-2), and 50 parts by weight of an ethylene-propylene copolymer rubber [SPO V0141, manufactured by Sumitomo Chemical Co., Ltd., propylene unit content of 27% by weight, MFR of 1 g/10 min.] were kneaded at 200° C. and a shear rate of $1.2 \times 10^3$/sec. with a twin-screw extruder to obtain a composition [η*(1) of $2.7 \times 10^3$ poise, n of 0.08], which was cut by a cutter to obtain granules.

The granules were cooled to −120° C. by using liquid nitrogen and then pulverized while keeping the cooled state to obtain the powder of the thermoplastic elastomer composition [passed through Tyler standard sieve of 32 mesh (opening of 500 μm×500 μm)].

On the molding surface of a nickel-electroplated grains plate (30 cm×30 cm×3 mm in thickness) whose surface temperature was heated to 250° C., 1000 g of the powder of the thermoplastic elastomer composition obtained above was fed, and excess powder which was not thermally adhered by melting was dropped off from the mold after fourteen seconds. Then, the resultant was heated in an oven at 250° C. for 60 seconds, then cooled and successively released from the mold to obtain a sheet-like molded article (a thickness of 1 mm). The evaluation results of the thermoplastic elastomer composition and molded article are shown in Table 3.

EXAMPLES 2 to 8

The same operations as in Example 1 except that the weight ratios of (A) a propylene-ethylene copolymer resin, a hydrogenated product of butadiene-styrene copolymer as (B-1), a hydrogenated product of butadiene-styrene copolymeras (B-2), and (C) an ethylene-propylene copolymer rubber were changed to those in Tables 3 and 4, were carried out to obtain thermoplastic elastomer compositions and to obtain molded articles. The evaluation results of the thermoplastic elastomer compositions and the molded articles are shown in Tables 3 and 4.

Comparative Examples 1 to 4

The same operations as in Example 1 except that the weight ratios of (A) a propylene-ethylene copolymer resin, (B-1) a hydrogenated product rubbery polymer of butadiene-styrene copolymer, (B-2) a hydrogenated product rubbery polymer of butadiene-styrene copolymer, and (C) an ethylene-propylene copolymer rubber were changed to those in Table 5, were carried out to obtain thermoplastic elastomer compositions and to obtain molded articles. The evaluation results of the thermoplastic elastomer compositions and the molded articles are shown in Table 5.

TABLE 1

Temperature and intensity of tan δ peak of compositions consisting of (A) and (B-1)

| Composition Parts by weight | | | | | | | | |
|---|---|---|---|---|---|---|---|---|
| (A) | 100 | | 75 | | 50 | | 25 | 0 |
| (B-1) | 0 | | 25 | | 50 | | 75 | 100 |
| tan δ peak | | | | | | | | |
| Temperature | 7 | 7 | −49 | 7 | −45 | 9 | −35 | −37 |
| Intensity | 0.12 | 0.14 | 0.07 | 0.13 | 0.12 | 0.13 | 0.64 | 0.88 |

TABLE 2

Temperature and intensity of tan δ peak of compositions consisting of (A) and (B-2)

| Composition Parts by weight | | | | | |
|---|---|---|---|---|---|
| (A) | 100 | 75 | 50 | 25 | 0 |
| (B-1) | 0 | 25 | 50 | 75 | 100 |
| tan δ peak Temperature | 7 | −1 | −7 | −11 | −17 |
| Intensity | 0.12 | 0.20 | 0.39 | 0.73 | 1.5 |

TABLE 3

| Composition Parts by weight | Example | | | |
|---|---|---|---|---|
| | 1 | 2 | 3 | 4 |
| (A) | 100 | 100 | 100 | 100 |
| (B-1) | 87.5 | 75.0 | 50.0 | 12.5 |
| (B-2) | 12.5 | 25.0 | 50.0 | 87.5 |
| Total amount of (B-1) and (B-2) | 100 | 100 | 100 | 100 |
| (C) | 50.0 | 50.0 | 50.0 | 50.0 |
| $\eta^*(j)$ Poise (*1) | $2.7 \times 10^3$ | $2.9 \times 10^3$ | $3.6 \times 10^3$ | $4.9 \times 10^3$ |
| n (*2) | 0.08 | 0.08 | 0.10 | 0.12 |
| Whitening on bending | | | | |
| 500 g | ○ | ○ | ○ | ○ |
| 1000 g | Δ | ○ | ○ | ○ |
| Brittle temperature | < −67 | < −67 | < −67 | −63 |

TABLE 4

| Composition Parts by weight | Example | | | |
|---|---|---|---|---|
| | 5 | 6 | 7 | 8 |
| (A) | 100 | 100 | 100 | 100 |
| (B-1) | 80.0 | 87.5 | 75.0 | 20.0 |
| (B-2) | 20.0 | 37.5 | 50.0 | 40.0 |
| Total amount of (B-1) and (B-2) | 100 | 125 | 125 | 60 |
| (C) | 0 | 25.0 | 25.0 | 40.0 |
| $\eta^*(1)$ Poise (*1) | $1.8 \times 10^3$ | $3.1 \times 10^3$ | $3.8 \times 10^3$ | $2.5 \times 10^3$ |
| n (*2) | 0.11 | 0.12 | 0.15 | 0.15 |
| Whitening on pending | | | | |
| 500 g | ○ | ○ | ○ | ○ |
| 1000 g | ○ | ○ | ○ | ○ |
| Brittle temperature | −65 | <−67 | <−67 | <−60 |

TABLE 5

| Composition Parts by weight | Comparative Example | | | |
|---|---|---|---|---|
| | 1 | 2 | 3 | 4 |
| (A) | 100 | 100 | 100 | 100 |
| (B-1) | 100 | 0 | 0 | 0 |
| (B-2) | 0 | 100 | 100 | 0 |
| Total amount of (B-1) and (B-2) | 100 | 100 | 100 | 0 |
| (C) | 0 | 50.0 | 0 | 100.0 |
| $\eta^*(1)$ Poise (*1) | $8.0 \times 10^2$ | $4.4 \times 10^3$ | $2.0 \times 10^3$ | $6.9 \times 10^3$ |
| n (*2) | 0.04 | 0.12 | 0.05 | 0.14 |
| Whitening on bending | | | | |
| 500 g | X | ○ | ○ | X |
| 1000 g | X | ○ | ○ | X |
| Brittle temperature | <−67 | −58 | −48 | −63 |

Industrial Applicability

As described above, according to the present invention, a thermoplastic elastomer composition having an excellent powder moldability and resistance at lower temperature, and providing a molded article of a thermoplastic elastomer being hardly whitened on bending, powder and pellets obtained by using said thermoplastic elastomer composition, and a molded article thereof, can be provided.

What is claimed is:

1. (Amended) A thermoplastic elastomer composition comprising (A), (B-1) and (B-2) described below and having a total content of (B-1) and (B-2) of 10 to 250 parts by weight per 100 parts by weight of the content of (A), a complex dynamic viscosity $\eta^*(1)$ at 250° C. of $1.5 \times 10^5$ poise or less and a Newtonian viscosity index n of 0.67 or less;
   (A): a polyolefin-based resin,
   (B-1): a hydrogenated product of a conjugated diene-based thermoplastic elastomer providing two tan δ peaks within a temperature range of −70 to 30° C. in a temperature dependence curve of tan δ determined by a solid viscoelasticity measurement of a composition obtained by being kneaded with (A), and having a proportion of the number of hydrogenated conjugated diene units having a side chain with at least two or more of carbon atoms to the total number of hydrogenated conjugated diene units of less than 50%, and
   (B-2): a hydrogenated product of a conjugated diene-based thermoplastic elastomer providing a new single tan δ peak at a temperature which is different from both the tan δ peak temperature of (A) and the tan δ peak temperature of (B-2) within a temperature range of −70 to 30° C. in a temperature dependence curve of tan δ determined by a solid viscoelasticity measurement of a composition obtained by being kneaded with (A), having a proportion of the number of hydrogenated conjugated diene units having a side chain with at least two or more of carbon atoms to the total number of hydrogenated conjugated diene units of 60 to 95%, wherein the weight ratio of (B-1) to (B2) is 5:95 to 95:5.

2. The thermoplastic elastomer composition according to claim 1, further comprising (C) an ethylene-α-olefin-based copolymer rubber in an amount of up to 250 parts by weight per parts by weight of (A).

3. The thermoplastic elastomer composition according to claim 1, wherein (B-1) and/or (B-2) is a hydrogenated product of a copolymer of a conjugated diene with another monomer.

4. A thermoplastic elastomer composition according to claim 3, wherein the other monomer is a vinyl aromatic compound, a vinyl ester compound, an ethylenically unsaturated carboxylic acid ester compound, or a vinyl nitrile compound.

5. Powder prepared from the thermoplastic elastomer composition according to claim 1.

6. A thermoplastic elastomer composition according to claim 1, wherein the complex dynamic viscosity $\eta^*(1)$ at 250° C. is $5 \times 10^4$ poise or less and the Newtonian viscosity index n is 0.28 or less.

7. Pellets prepared from the thermoplastic elastomer composition according to claim 6.

8. Pellets according to claim 7, wherein the sphere-reduced average diameter is 1.2 mm or less and a bulk specific gravity is 0.38 or more.

9. Pellets according to claim 7, produced by a solvent-treatment method, a strand cut method or a die-face cut method.

10. A molded article obtained by powder molding the powder of the thermoplastic elastomer composition according to claim 5.

11. A molded article obtained by powder molding the pellets according to claim 7.

12. A two-layer molded article wherein a foamed layer is laminated on one surface side of the molded article according to claim 10.

13. A multi-layer molded article wherein a thermoplastic resin core material is laminated on one surface side of the molded article according to claim 10.

14. A multi-layer molded article wherein a thermoplastic resin core material is laminated on the foamed layer side of the two-layer molded article according to claim 12.

15. A process for producing a multi-layer molded article according to claim 13, including that a thermoplastic resin melt is fed on one surface of the molded article according to claim 10 and pressed.

16. A process for producing a multi-layer molded article according to claim 14, including that a thermoplastic resin melt is fed on the foamed layer side of the two-layer molded article according to claim 12 and pressed.

17. A process according to claim 15, wherein the molded article according to claim 10 is fed between a pair of opened molds and then both molds are clamped after or while feeding a thermoplastic resin melt between one surface side of the molded article and one mold which is opposite to this.

18. A process according to claim 16, wherein the two-layer molded article according to claim 12 is fed between a pair of opened molds and then both molds are clamped after or while feeding a thermoplastic resin melt between the foamed layer of the molded article and one mold which is opposite to this.

* * * * *